(12) United States Patent
Emerick et al.

(10) Patent No.: US 9,762,578 B2
(45) Date of Patent: Sep. 12, 2017

(54) METHODS AND SYSTEMS FOR ESTABLISHING SECURE AUTHENTICATED BIDIRECTIONAL SERVER COMMUNICATION USING AUTOMATED CREDENTIAL RESERVATION

(75) Inventors: Gregory M. Emerick, O'Fallon, MO (US); Paul J. Gifford, Somerset, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 282 days.

(21) Appl. No.: 12/911,388

(22) Filed: Oct. 25, 2010

(65) Prior Publication Data

US 2012/0102554 A1 Apr. 26, 2012

(51) Int. Cl.
*G06F 15/16* (2006.01)
*H04L 29/06* (2006.01)
*H04L 9/32* (2006.01)

(52) U.S. Cl.
CPC .......... *H04L 63/0884* (2013.01); *H04L 9/321* (2013.01); *H04L 63/0846* (2013.01); *H04L 2209/38* (2013.01)

(58) Field of Classification Search
CPC ....... H04L 63/08; H04L 9/321; H04L 9/3271; H04L 63/1416; H04L 63/1408; H04L 63/1441; H04L 63/1458; G06F 21/552
USPC .............. 726/6, 1, 13, 22–33; 713/153–154, 713/187–188, 193–194; 709/206, 249, 709/389
See application file for complete search history.

(56) References Cited

U.S. PATENT DOCUMENTS

| | | | |
|---|---|---|---|
| 5,542,072 A | | 7/1996 | Kawashima et al. |
| 5,751,812 A | * | 5/1998 | Anderson ............... G06F 21/31 380/28 |
| 6,088,796 A | | 7/2000 | Cianfrocca et al. |
| 6,148,404 A | | 11/2000 | Yatsukawa |
| 6,363,421 B2 | | 3/2002 | Barker et al. |
| 6,463,474 B1 | * | 10/2002 | Fuh ..................... H04L 63/0227 709/225 |
| 6,496,858 B1 | | 12/2002 | Frailong et al. |
| 7,100,054 B2 | | 8/2006 | Wenisch et al. |
| 7,240,364 B1 | | 7/2007 | Branscomb et al. |
| 7,546,288 B2 | | 6/2009 | Springer, Jr. et al. |

(Continued)

FOREIGN PATENT DOCUMENTS

| | | |
|---|---|---|
| CN | 101207483 A | 6/2008 |
| WO | 2006119248 A2 | 11/2006 |
| WO | 2009/026096 A2 | 2/2009 |

OTHER PUBLICATIONS

International Search Report for PCT/US2011/054526 dated Aug. 2, 2012.

(Continued)

*Primary Examiner* — Evans Desrosiers
(74) *Attorney, Agent, or Firm* — Lando & Anastasi, LLP

(57) ABSTRACT

A method of authenticating communications includes receiving, by a computer, a first set of credentials, verifying the first set of credentials by comparing the first set of credentials to a plurality of sets of credentials stored in a database, subsequent to verifying the first set of credentials, deriving a second set of credentials, and transmitting notification of the second set of credentials to a remote computer.

18 Claims, 13 Drawing Sheets

(56) References Cited

U.S. PATENT DOCUMENTS

| | | | |
|---|---|---|---|
| 7,627,651 | B2 | 12/2009 | Joy et al. |
| 7,796,589 | B2 | 9/2010 | Cohen et al. |
| 2001/0052006 | A1 | 12/2001 | Barker et al. |
| 2002/0052876 | A1 | 5/2002 | Waters |
| 2003/0033545 | A1* | 2/2003 | Wenisch et al. ............ 713/202 |
| 2004/0088331 | A1 | 5/2004 | Therrien et al. |
| 2004/0133609 | A1 | 7/2004 | Moore et al. |
| 2004/0153451 | A1 | 8/2004 | Phillips et al. |
| 2004/0230800 | A1 | 11/2004 | Futa et al. |
| 2005/0080810 | A1 | 4/2005 | Matsuura |
| 2005/0228886 | A1 | 10/2005 | Cain et al. |
| 2006/0005032 | A1 | 1/2006 | Cain et al. |
| 2006/0248577 | A1 | 11/2006 | Beghian et al. |
| 2007/0022469 | A1 | 1/2007 | Cooper et al. |
| 2007/0028104 | A1 | 2/2007 | Cohen et al. |
| 2007/0038414 | A1 | 2/2007 | Rasmussen et al. |
| 2007/0234408 | A1* | 10/2007 | Burch .................. G06F 21/31 726/6 |
| 2007/0250486 | A1 | 10/2007 | Liao et al. |
| 2010/0211669 | A1 | 8/2010 | Dalgas et al. |
| 2011/0066696 | A1 | 3/2011 | Cohen et al. |
| 2012/0096297 | A1 | 4/2012 | Archibald et al. |
| 2012/0102039 | A1 | 4/2012 | Gifford et al. |

OTHER PUBLICATIONS

Austerberry, D., "The Components of a Digital Asset Management System," Journal of Digital Asset Management, Palgrave MacMillan Ltd., Hants, GB, vol. 1, No. 2, Mar. 1, 2005 (Mar. 1, 2005), pp. 131-145, XP001247000.

Camarillo, G. et al., "Peer-to-Peer (P2P) Architecture: Definition, Taxonomies, Examples, and Applicability: rfc5694.txt," Peer-To-Peer (P2P) Architecture: Definition, Taxonomies, Examples, and Society (ISOC) 4, Rue Des Falaises CH-1205 Geneva, Switzerland, Nov. 16, 2009 (Nov. 16, 2009), pp. 1-26, XP015068112.

Elmasri et al., "Fundamentals of Database Systems Fourth Edition", Fundamentals of Database Systems, XX, XX, No. Ed., 4, Sep. 1, 2004 (Sep. 1, 2004), pp. 25-45, 207, XP00233626, pp. 38-42.

Elmasri R. et al., "Fundamentals of Database Systems—Passage", Fundamentals of Database Systems, XX, XX, Jan. 1, 2004 (Jan. 1, 2004), pp. 767-819, XP002416935, p. 803-816.

Elmasri R. et al., "Fundamentals of Database Systems, Passage", Fundamentals of Database Systems, XX, XX, Jan. 1, 2004 (Jan. 1, 2004), pp. 455-491, XP002354081, p. 455-456.

Litwin W. et al., "Interoperability of Multiple Autonomous Databases", ACM Computing Surveys, ACM, New York, NY, US, vol. 22, No. 3, Sep. 1, 1990 (Sep. 1, 1990), pp. 267-293, XP002908614.

Sheth et al., "Federated Databases Systems for Managing Distributed, Heterogeneous, and Autonomous Databases", Internet Citation, Sep. 1990 (Sep. 1990), XP002132066, Retrieved from the Internet: URL:http://www.acm.org/pubs/contents/journals/surveys/1990-22-3/p183-sheth/p183-sheth.pdf [retrieved on Mar. 2, 2000], p. 189-191, p. 225.

* cited by examiner

METHODS AND SYSTEMS FOR ESTABLISHING SECURE AUTHENTICATED BIDIRECTIONAL SERVER COMMUNICATION USING AUTOMATED CREDENTIAL RESERVATION

RELATED APPLICATIONS

This application is related to co-pending U.S. application Ser. No. 12/911,390, entitled "METHODS AND SYSTEMS FOR PROVIDING IMPROVED ACCESS TO DATA AND MEASUREMENTS IN A MANAGEMENT SYSTEM,", and filed on Oct. 25, 2010, which is herein incorporated by reference in its entirety.

BACKGROUND OF THE INVENTION

1. Field of the Invention

The present invention relates generally to the field of secure network communications, and more particularly, to methods and systems for establishing secure authenticated bidirectional server communication using automated credential reservation.

2. Discussion of Related Art

Data centers are widely used to house various types of electrical equipment, including computer systems and the physical infrastructure needed to support such systems, such as power supplies (e.g., uninterruptible power supplies and backup power supplies), environmental systems (e.g., air conditioning, fire suppression, etc.), physical data center security, and other monitoring devices. Companies that depend on the proper and efficient operation of their data centers use various tools to monitor and operate the physical infrastructure, including multiple monitoring systems that are coordinated to provide centralized collection and reporting of critical infrastructure events.

BRIEF SUMMARY OF THE INVENTION

According to one embodiment, a method of authenticating communications includes acts of receiving, by a computer, a first set of credentials and verifying the first set of credentials by comparing the first set of credentials to a plurality of sets of credentials stored in a database. Subsequent to verifying the first set of credentials, the method further includes acts of deriving a second set of credentials, and transmitting notification of the second set of credentials to a remote computer.

According to various embodiments, the act of verifying the first set of credentials may be performed by the remote computer. The first set of credentials may be created by a user of the computer. The first set of credentials may be created on the remote computer. The first set of credentials may include a username and password. At least one of the first set of credentials and the second set of credentials may be encrypted by the computer. The second set of credentials may be stored in a database accessible by the computer.

In another embodiment, the method may further include an act of receiving, by the computer, contact information for the remote computer.

In another embodiment, the method may further include an act of establishing, by the remote computer, secure communications with the computer using at least the second set of credentials.

In yet another embodiment, the method may further comprise an act of automatically changing at least one of the first set of credentials and the second set of credentials using the at least one of the first set of credentials and the second set of credentials as a seed for calculating a new set of credentials to replace the at least one of the first set of credentials and the second set of credentials. The act of automatically changing may occur periodically. The act of automatically changing may occur in response to at least one of a user event, a system event, and a security event.

According to another embodiment, a method of authenticating communications between a first computer and a second computer includes acts of receiving, from a user, a first set of credentials at the first computer; receiving, from the user, the first set of credentials at the second computer; calling, by the second computer, a first service operating on the first computer, the first service configured to provide verification of the first set of credentials to the second computer; responsive to receiving the verification of the first set of credentials from the second computer, deriving a second set of credentials by the second computer; and transmitting notification of the second set of credentials from the second computer to the first computer.

In another embodiment, the method may further include an act of establishing, by the second computer, secure communications with the first computer using at least the second set of credentials.

In another embodiment, the method may further include an act of establishing, by the first computer, secure communications with the second computer using at least the first set of credentials.

In yet another embodiment, the method may further include an act of automatically changing at least one of the first set of credentials and the second set of credentials using the at least one of the first set of credentials and the second set of credentials as a seed for calculating a new set of credentials to replace the at least one of the first set of credentials and the second set of credentials. The act of automatically changing may occur periodically. The act of automatically changing may occur in response to at least one of a user event, a system event, and a security event.

According to another embodiment, a data center infrastructure management system includes a network, a first server connected to the network, a plurality of data center infrastructure devices connected to the first server, the first server being configured to maintain device data related to management of the plurality of data center infrastructure devices, and a second server connected to the network and configured to verify a set of user-created credentials, to be supplied by the first server, by comparing the set of user-created credentials to a plurality of sets of user-created credentials stored in a database, the second server further configured to derive a set of server-created credentials based on the set of user-created credentials subsequent to verifying the set of user-created credentials, the second server further configured to notify the first server of the set of server-created credentials subsequent to deriving the set of server-created credentials. The first server uses the set of server-created credentials to establish secure communication with the second server for exchanging the device data with the second server.

In another embodiment, the system may be configured to establish secure communication between the first server and a second server through the network using at least the set of used-created credentials and the set of server-created credentials.

According to one embodiment, a data center infrastructure management system includes a plurality of central servers configured to maintain device data related to management of a plurality of data center infrastructure devices located within one or more data centers and a global server connected to the plurality of central servers through a first network. The global server is configured to receive at least a subset of the device data asynchronously from each of the plurality of central servers, and is further configured to store the at least the subset of the device data in a database, and is further configured to generate and maintain an index of the subset of the device data. The index is configured to facilitate searching of the subset of the device data in the database by the global server. The system further includes a global client connected to the global server through a second network, the global client having a user interface configured to request and receive from the global server at least one of a portion of the subset of the device data and a portion of the device data. The portion of the subset of the device data is to be located in the database using the index by the global server in response to the request, and the portion of the device data is to be received from the plurality of central servers in response to a request by the global client for data that is not in the database.

In another embodiment, the global client may include a thin client device that includes a terminal having at least the components necessary for receiving input from a user, displaying output to the user, and communicating with the global server.

In another embodiment, the subset of the device data may includes data center asset inventory data.

In yet another embodiment, the global server may be further configured to request the device data from the plurality of central servers in response to the request from the global client for the device data, wherein the device data is not stored in the database, and wherein the global server is further configured to provide the device data to the global client in a lightweight format subsequent to receiving the device data from the plurality of central servers. The lightweight format of the device data may be a format that is adapted for consumption by a thin client device that includes a terminal having at least the components necessary for receiving input from a user, displaying output to the user, and communicating with the global server.

In another embodiment, the global client may include a data requestor component configured to request at least one of the portion of the subset of the device data and the portion of the device data, and further configured to display the at least one of the portion of the subset of the device data and the portion of the device data.

In another embodiment, the index may include a table of ordered records including at least one of the data, an occurrence frequency of the data, a database table name, and identification information for locating the data in the database.

According to another embodiment, a data center infrastructure management system includes a plurality of central servers configured to maintain device data related to management of a plurality of data center infrastructure devices located within one or more data centers. Each of the plurality of central servers has an asynchronous event component configured to automatically generate a first portion of the device data in response to a change in a status of at least one of the plurality of data center infrastructure devices, and a first device data service component configured to service a request for a second portion of the device data, the second portion of the device data being different than the first portion of the device data. The system further includes a global server connected to each of the plurality of central servers through a network. The global server has an asynchronous event handling component configured to receive the first portion of the device data from the one or more central servers, a second device data service component configured to service a request for at least one of the first portion of the device data and the second portion of the device data, a data access component configured to maintain a database containing at least the first portion of the device data, and a data indexing component configured to generate and maintain an index of the first portion of the device data contained in the database. The index is configured to facilitate searching of the first portion of the device data.

In another embodiment, the system may further include a global client connected to the global server. The global client may have a data requestor component configured to request at least one of the first portion of the device data and the second portion of the device data, and may further have a user interface configured to display at least one of the first portion of the device data and the second portion of the device data.

In yet another embodiment, the global client may include a thin client device that includes a terminal having at least the components necessary for receiving input from a user, displaying output to the user, and communicating with the global server.

In another embodiment, the global client may include a data requestor component configured to request at least one of the first portion of the device data and the second portion of the device data, and may further be configured to display at least one of the first portion of the device data and the second portion of the device data.

In another embodiment, the index may include a table of ordered records including at least one of the data, an occurrence frequency of the data, a database table name, and identification information for locating the data in the database.

In another embodiment, the first portion of the device data may include a status of at least one of a data center server, a data center device, and a data center device group. The status may include at least one of sensor data, log data, and alarm data.

According to another embodiment, a method of managing device data related to a data center infrastructure includes generating, by a first server, a first portion of the device data in response to a change in a status of at least one of a plurality of data center infrastructure devices, storing, by a second server, the first portion of the device data in a database, and generating an index, by the second server, of the first portion of the device data. The index is configured to facilitate searching of the first portion of the device data by the second server. The method further includes generating, by the first server, a second portion of the device data in response to a request for data that is not contained in the database. The second portion of the device data is different than the first portion of the device data and is generated in a lightweight format. The lightweight format is adapted for consumption by a thin client device. The method further includes displaying, in response to a user request, at least a portion of the first portion of the device data using a user interface that is provided to a client computer by the second server.

In another embodiment, the method may further include searching, responsive to receiving a search request from a user, the first portion of the device data using the index to find data satisfying the search request.

In yet another embodiment, the thin client device may include a terminal having at least the components necessary for receiving input from a user, displaying output to the user, and communicating with at least one of the first server and the second server.

In another embodiment, the method may further include automatically polling, by the second server, the first server to retrieve an update to the first portion of the device data.

In another embodiment, the method may further include asynchronously transmitting to the second server, by the first server, an update to the first portion of the device data.

In yet another embodiment, the method may further include generating a list of suggested search terms based on the first portion of the device data and on a user-supplied search query. The list of suggested search terms may include one or more terms derived from the first portion of the device data.

In another embodiment, the user interface may be configured to display the list of suggested search terms to a user in response to receiving the user-supplied search query. The user interface may be further configured to enable the user to select one search term from the list of suggested search terms.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
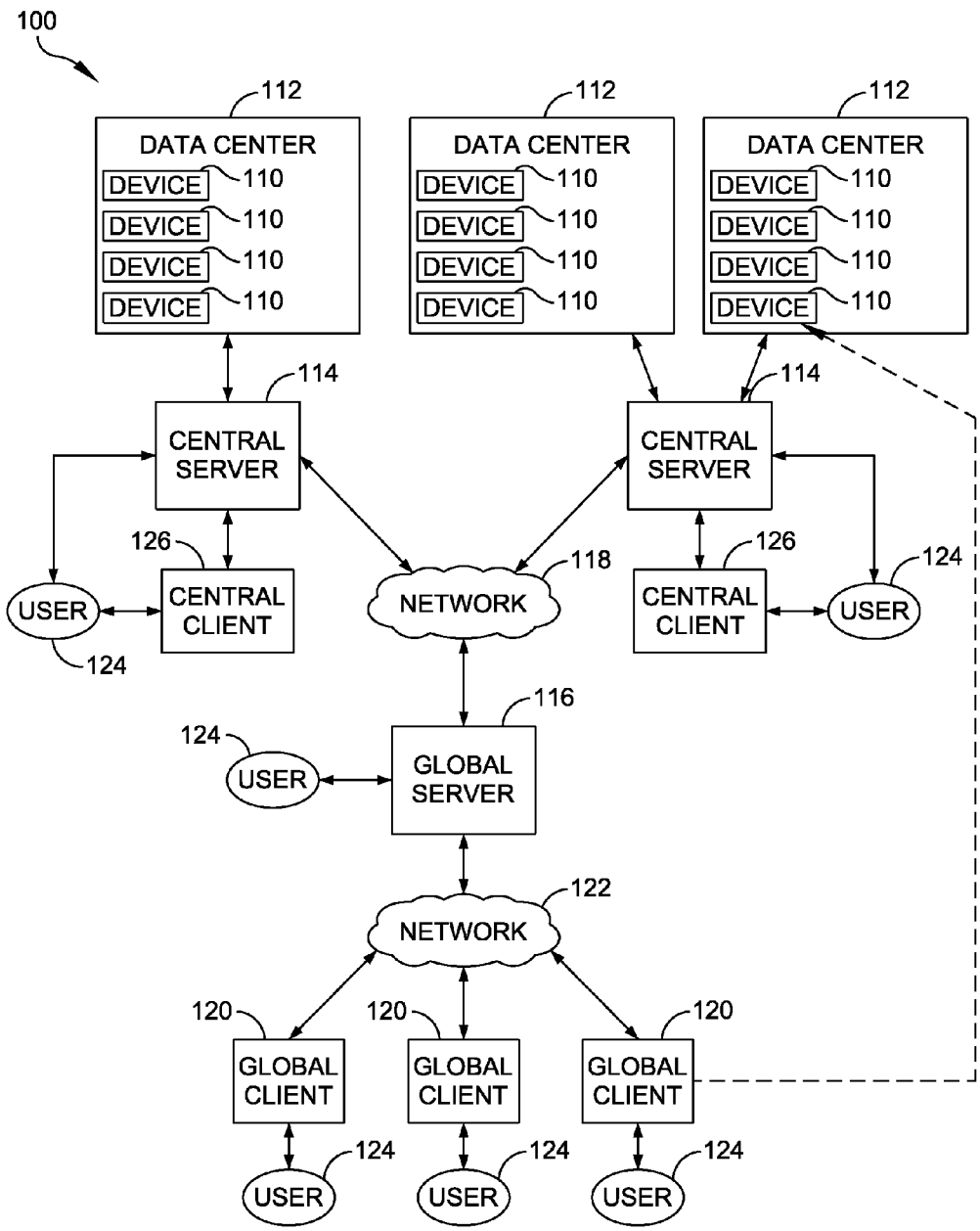
FIG. 1 is a block diagram of a data center infrastructure management system in accordance with one embodiment of the present invention.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, various tools are used to manage the physical infrastructures of data centers. It is appreciated that additional tools can be deployed for monitoring large-scale and/or physically disparate data centers. Due to the critical nature of data center operations, these monitoring systems must exchange data with each other quickly and securely. Therefore, before exchanging any sensitive data, various devices (e.g., a server and a client) must provide authentication credentials.

In one known technique, authentication credentials are pre-programmed into each device on the network prior to establishing secure communications between them. However, security vulnerabilities arise when those credentials are acquired by a non-trusted party having access to those devices. Further, pre-programming the credentials into each device is labor intensive and prone to error.

Embodiments of the present invention provide techniques for establishing secure, authenticated, bidirectional communication between multiple computers across a network. In one embodiment, establishing bidirectional communication between two computers utilizes an automated credential reservation system. In the automated credential reservation system, each computer provides authentication credentials (e.g., username and password) to the other computer before, for example, unsolicited data is securely exchanged between them. Initially, a user creates a first set of credentials on a first computer. The first set of credentials will be used by a second computer to access the first computer. The user then enters the first set of credentials on the second computer along with contact information (e.g., a hostname) of the first computer. The second computer calls a service on the first computer (e.g., over a network connection), which verifies the first set of credentials to the second computer. Once verified, the second computer automatically derives a second set of credentials, which will be used by the first computer to access the second computer, and transmits the second set of credentials to the first computer. In this manner, secure, bidirectional communication can be established between the first computer and the second computer using multiple sets of credentials that are based on a single set of user-created credentials. For example, a set of server-created credentials may be derived from, but different than, the user-created credentials. The server-created credentials may be unique for authenticating communication between the first computer and the second computer.

FIG. 1 illustrates a block diagram of a data center infrastructure management system 100 for managing the physical infrastructure (e.g., power, cooling, security, and environment) of one or more data centers 112 in accordance with one embodiment of the present invention. The system 100 is configured to monitor a plurality of devices 110 located within one or more data centers 112. The system 100 includes one or more central servers 114 that are each connected to at least some of the devices 110. The central servers 114 may be servers, clients, or both. The system 100 further includes a global server 116 that is connected to each of the central servers 114 over a network 118. It should be understood that the system 100 may include more than one global server 116, and that the infrastructure of one data center 112 may be managed by more than one central server 114. One or more global clients 120 are connected to the global server 116 over a network 122, which may be the same as network 116. Optionally, one or more of the global clients 120 may be connected to one or more devices 110.

The system 100 monitors incoming alarms and other telemetric data from the devices 110, such as uninterruptible power supplies (UPS), cooling systems, environmental sensors, video cameras, power distribution systems, and power or load management systems, which are located in the data centers 112. The system 100 may also control each of the devices 110. Each central server 114 collects data from the devices 110 in one associated data center 112, or multiple associated data centers, analyzes the data, and provides alarms, reports, and other relevant information to a user through a central client 126. Further, each central server 114 provides the alarms, reports, and other information to the user 124 through the global server 116. While the central server 114 only maintains data received from the devices 110 within an associated data center 112, the global server 116 aggregates data from all central servers 114 and provides a single access point for each global client 120 to the data from all data centers. Other data, including user-supplied and server-supplied data that are used to established secure communications, may be exchanged between each central server 114 and the global server 116. The user 124 may access the central server 114, the global server 116, or both directly (e.g., using a local user interface) to create user credentials, such as a username and password, to configure the global server to access one or more central servers, or to perform other administrative functions.

Figure 2:
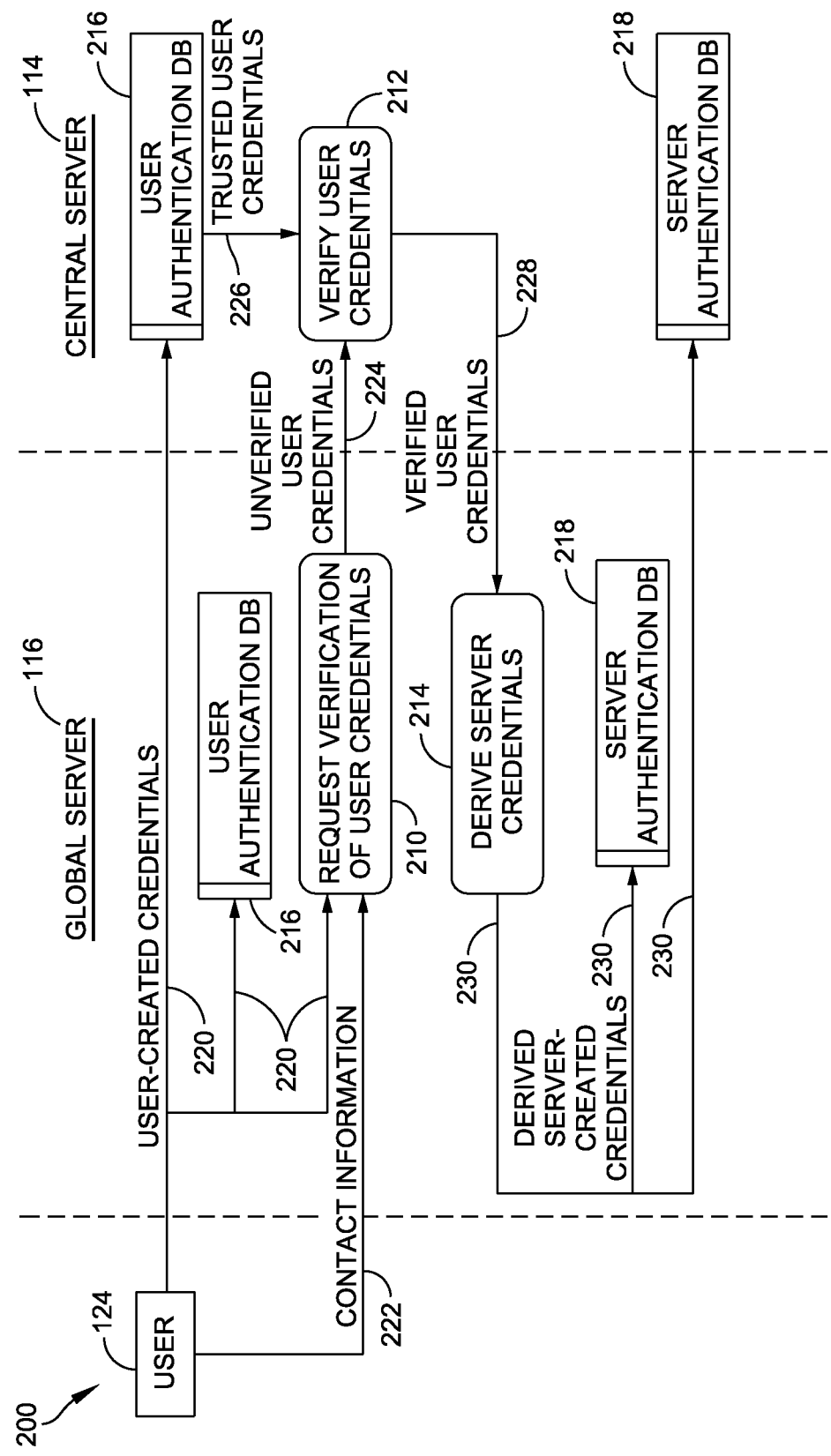
FIG. 2 is a data flow diagram of an automated credential reservation system for a data center infrastructure management system in accordance with one embodiment of the present invention.

FIG. 2 is a data flow diagram of an automated credential reservation system 200 for the data center infrastructure management system 100, as described above with reference to FIG. 1, in accordance with one embodiment. The automated credential reservation system 200 includes a plurality of processes executing on the central server 114, the global server 116, or both, including a request verification of user credentials process 210, a verify user credentials process 212, and a derive server credentials process 214. As used herein, a process is any instance of a computer-executable program, or portion thereof, that is being executed by a processor of the computer (e.g., the central server 114, the global server 116, the global client 120, and so forth). It should be understood that, as shown in FIG. 2, the central server 114 may be any server, and that the global server 116 may be any server (e.g., the automated credential reservation system 200 may comprise two or more central servers, two or more global servers, or any combination thereof). The automated credential reservation system 200 further includes a plurality of data stores (or databases), including a user authentication database 216 and a server authentication database 218. The plurality of data stores are implemented, in one embodiment, using a storage medium connected to the system 200, such as a hard disk drive, flash memory, or another computer storage medium. A plurality of data flows includes user-created credentials data 220, contact information data 222, unverified user credentials data 224, trusted user credentials data 226, verified user credentials data 228, and derived server-created credentials data 230. As used herein, a data flow represents the exchange of data between two or more processes.

The automated credential reservation system 200 enables two or more servers (e.g., the global server 116 and at least one central server 114) to each maintain credentials for authenticating requests originating from one or more of the other servers using a set of user-supplied credentials that are unique to at least one of the servers (e.g., unique to the central server 114). The user-created credentials may be uniquely associated with one of the servers, or may be common among more than one server. When the global server 116 is given the user-created credentials data 220 needed to access the central server 114, the global server automatically derives server-created credentials data 230 for the central server to use when accessing the global server, stores the derived server-created credentials data within a database for future authentication verification (e.g., creating a reservation for future access to the global server by the central server, such as for posting unsolicited authenticated requests to services provided by the global server), and notifies the central server of the derived server-created credentials data. The notification may be, for example, a call from the global server into a process (e.g., a service configured to receive a notification call) running on the central server which includes information identifying the derived server-created credentials data 230. In one non-limiting example, once notified that the derived server-created credentials data 230 are available, the central server 114 may use the derived server-created credentials data to access the global server 116, and further, the global server may use the user-created credentials 220 to access the central server. It should be understood that either the global server 116 or the central server 114 may create the derived server-created credentials data 230 (e.g., either server may create and post the derived server-credentials to the other server).

The following describes one exemplary data flow of the automated credential reservation system 200, as shown in FIG. 2. The user 124 provides the user-created credentials data 220 to the central server 114, which is stored in the user authentication database 216 on the central server. The user-created credentials data 220 includes, for example, a username and password that are used by the global server 116 to access services and data on the central server 114. The user 124 also provides the user-created credentials data 220 (e.g., for the central server 114) to the global server 116, along with the contact information data 222, such as a hostname of the central server, which is used by the global server to contact the central server. The request verification of user credentials process 210, operating on the global server 116, transmits the unverified user credentials data 224 to the verify user credentials process 212 operating on the central server 114. The verify user credentials process 212 compares the unverified user credentials data 224 to the trusted user credentials data 226 stored in the user authentication database 216 and returns, to the global server 116, the verified user credentials data 228 (which may include information with respect to whether the user credentials are or are not verified). The trusted user credentials data 226 may be the same as the user credentials data 220.

The derived server-created credentials process 214, operating on the global server 116, receives the verified user credentials data 228 from the central server 114 and produces the derived server-created credentials data 230, which is transmitted to and stored in the server authentication database 218 on the global server 116, the central server 114, or both. The derived server-created credentials data 230 may then be used by the central server 114 to access the central server 116, for example, to asynchronously post data to the global server 116.

Figure 3:
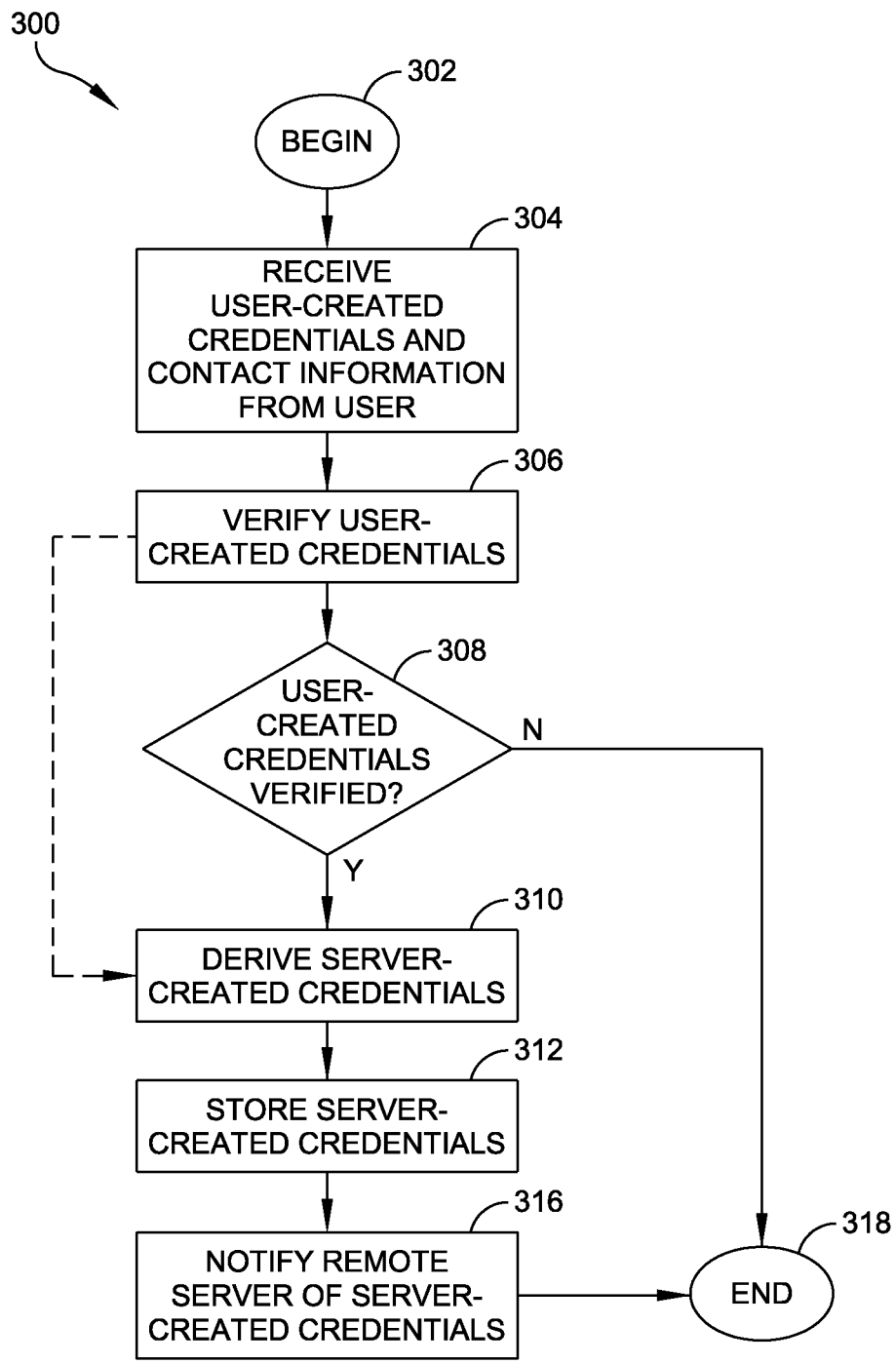
FIG. 3 illustrates a flow chart of a method for establishing secure authenticated bidirectional server communication using an automated credential reservation according to one embodiment of the present invention.

FIG. 3 illustrates a flow chart of a method for establishing secure authenticated bidirectional server communication using an automated credential reservation 300 according to one embodiment. The bidirectional server communication occurs between a first server (e.g., the central server 114, as shown and described above with reference to FIGS. 1 and 2) and at least a second server (e.g., the global server 116, as shown and described above with reference to FIGS. 1 and 2), or other computer, by sharing authentication credentials with each other. In one example, the second server may establish a trusted relationship with the first server by receiving verified user credentials from the first server. The first server may also establish a trusted relationship with the second server, such as described in further detail below with reference to FIG. 3.

The method 300 of FIG. 3 begins at block 302. At block 304, user-created credentials and contact information are received by the first server from a user. The user-created credentials include authentication information (e.g., a username and password) used by one or more servers, including the second server, to authenticate any request for services on the respective servers. The contact information includes information describing one or more remote servers to be contacted, such as a hostname, IP address, or other locating information. The contact information is used by the first server to identify the second server, and for sending a credential verification request to the second server. The received user-created credentials may be stored, by the first server, in a database for future use.

At block 306, the user-created credentials are verified by at least the second server. In one example, the first server sends a user-created credential verification request to the second server, which includes the user-created credentials. The second server compares the user-created credentials received from the first server against a user credential database, and if the credentials match, returns a verification message to the first server. The user-created credentials may be encrypted for enhanced security. At block 308, if the user-created credentials are not verified, process 300 continues to block 318; otherwise, the process continues to block 310. It should be understood that blocks 306 and 308 are optional. For example, the user-created credentials may be verified in other ways, such as by notifying the second server that the first server has created the derived server-created credentials, such as described below with reference to block 316 (e.g., the user-created credentials are verified if the notification is successful). However, the method of block 306 may be used to enhance data security.

At block 310 the first server derives a set of server-created credentials that can be used by the second server to access the first server. The server-created credentials may be automatically derived. This automation avoids the necessity of manually creating the server-created credentials, and is useful, for example, where the first server is in a trusted relationship with the second server. In one example, the first server maintains a service that is designed to facilitate communication with the second server (e.g., a service that is configured to receive and process requests from the second server), and the second server maintains another service that is designed to facilitate communication with the first server. At block 312, the server-created credentials are stored in a database, and at block 316, the second server is notified by the first server that the server-created credentials have been created. In one example, the first server notifies the second server of the server-created credentials by posting (e.g., using a HTTP POST request) the server-created credentials to a service provided by the second server, the service being configured to receive the post. The second server may then use the server-created credentials to gain unsolicited access to services provided by the first server using secure, authenticated communications. At block 318, process 300 ends.

In another embodiment, the user and/or server credentials will automatically change periodically (e.g., as a security feature). In one example, the original user-created credentials and server-created credentials are used as seeds for calculating one or more new server-created credentials. Either or both the first server and the second server may derive new credentials, notify the other server of the new credentials, and then disable the old credentials. This reduces the risk of unauthorized access to either or both the first server and the second server by a third party who has obtained any of the credentials. The periodicity of change may be any length of time (e.g., every few milliseconds, minutes, hours, days, weeks, months, years, etc.). The automatic change may also occur upon request from a user (e.g., a system operator) or upon occurrence of an event (e.g., a security event, a user login or logout, a detected fault, or other relevant event).

In one embodiment, the source code for executing process 300 may be coded in Java™ by Oracle Corporation, or in another programming language.

Figure 4A:
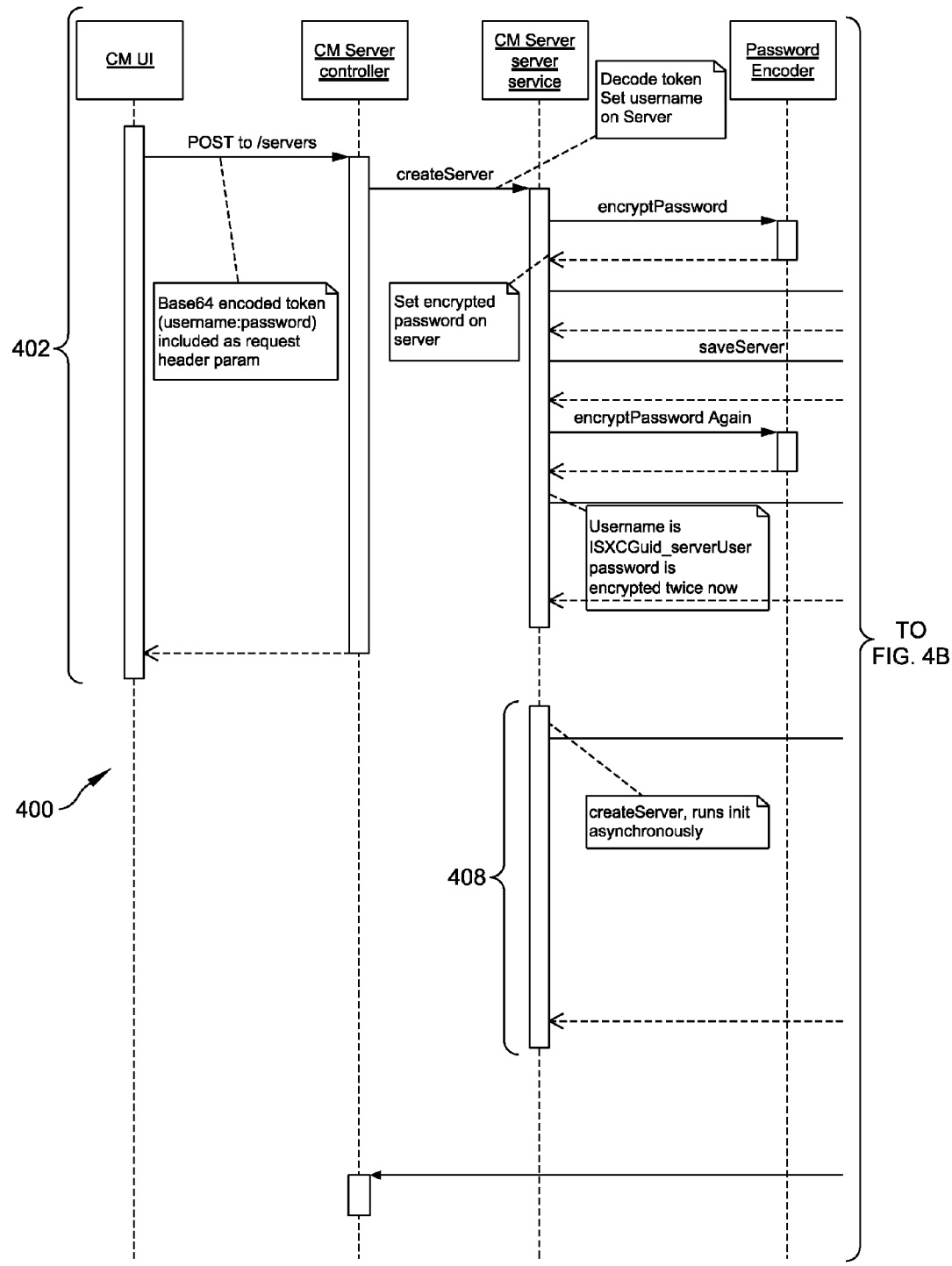
FIGS. 4A, 4B and 4C illustrate a unified modeling language model of a data center infrastructure management system in accordance with one embodiment of the present invention.
Figure 4B:
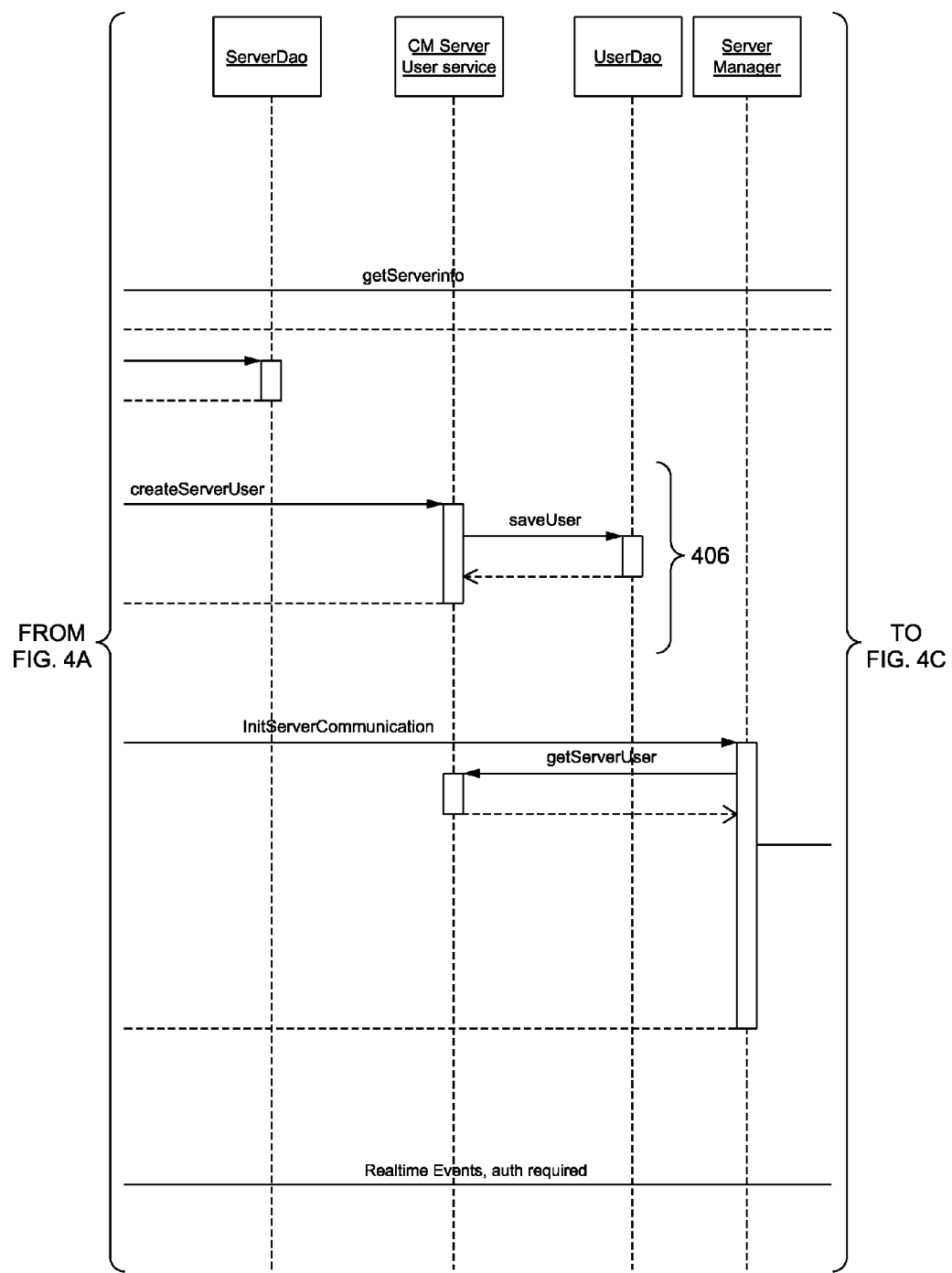
Figure 4C:
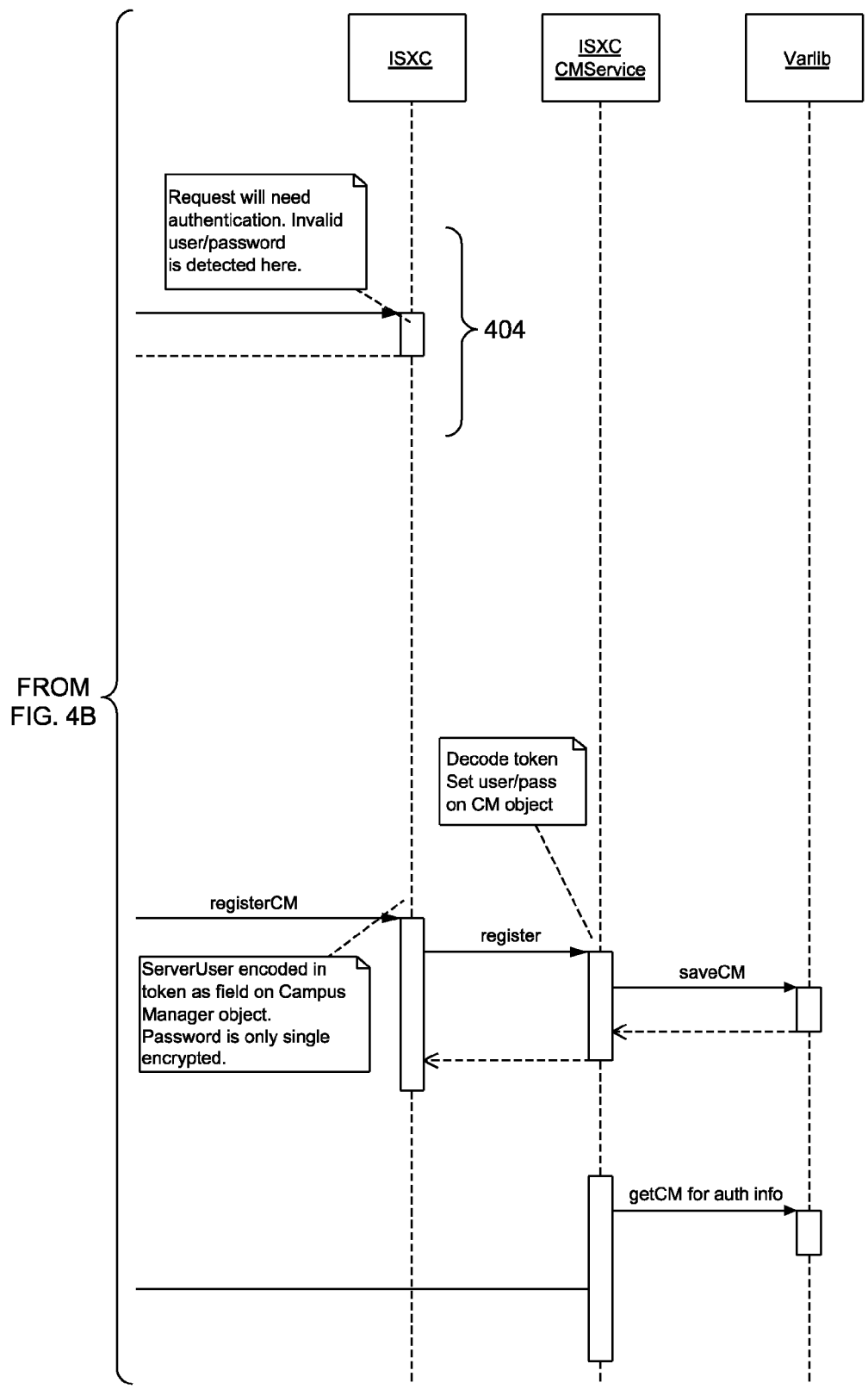

FIGS. 4A, 4B and 4C illustrate a unified modeling language (UML) model of a data center infrastructure management system, such as system 100 as described above with reference to FIG. 1, in accordance with one embodiment. Generally indicated at 402 is a data flow that occurs during an automated credential reservation process, such as described above with reference to FIG. 2. A first server passes a set of user credentials (e.g., username and password) to a second server for verification, as indicated generally at 404. If the second server validates the user credentials, the first server derives a set of server credentials, and saves the server credentials for future use, as indicated generally at 406. The first server then establishes secure communication with the second server, as generally indicated at 408.

Figure 5:
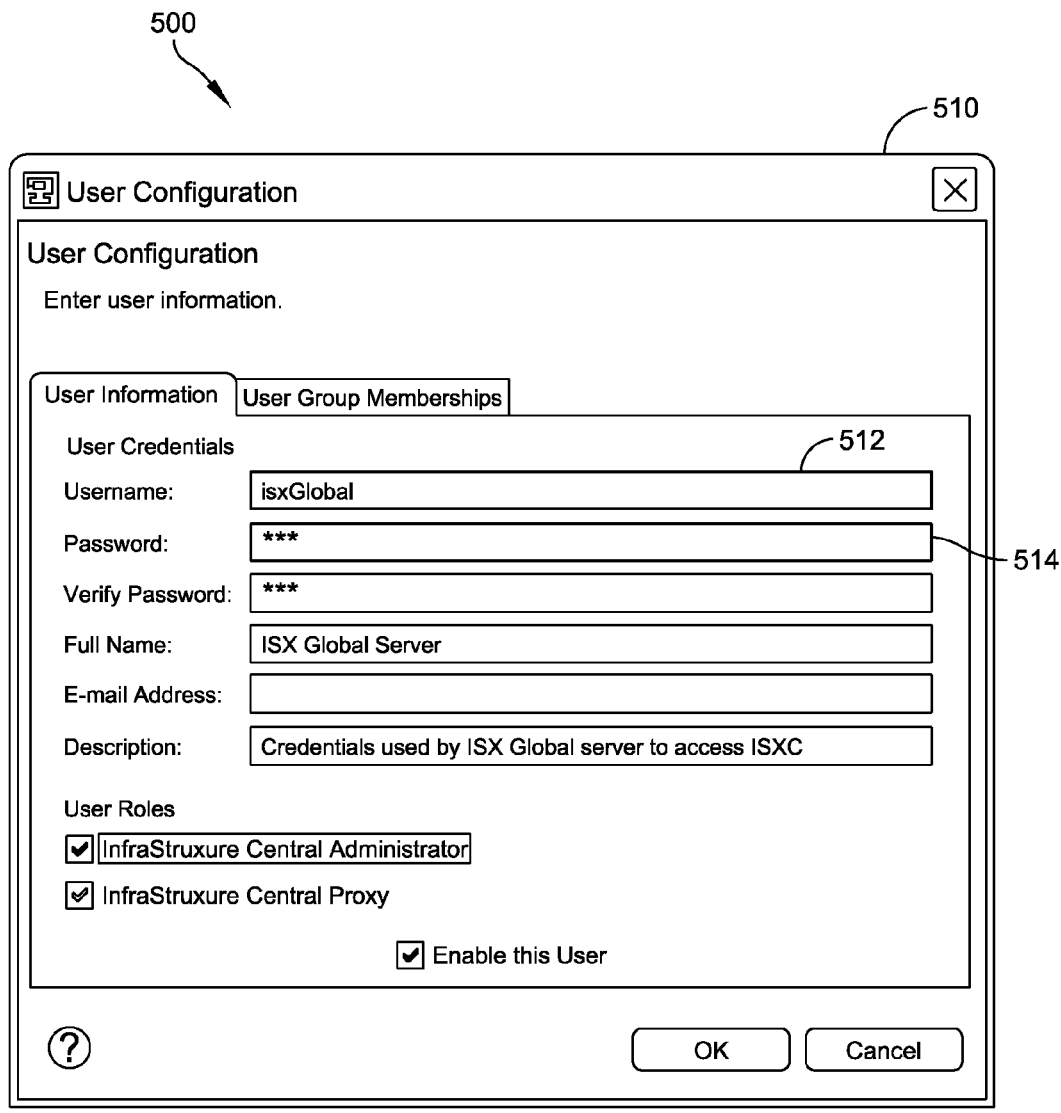
FIG. 5 illustrates a user interface in accordance with one embodiment of the present invention.

FIG. 5 illustrates a user interface 500 in accordance with one embodiment. The user interface 500 includes a user configuration dialog box 510, which includes a username entry field 512, and a password entry field 514. The user interface 500 is used by a user to create the user-created credentials data 220 of FIG. 2. The user interface 500 may, for example, be implemented on the central server 114, such as described above with reference to FIG. 1.

Figure 6:
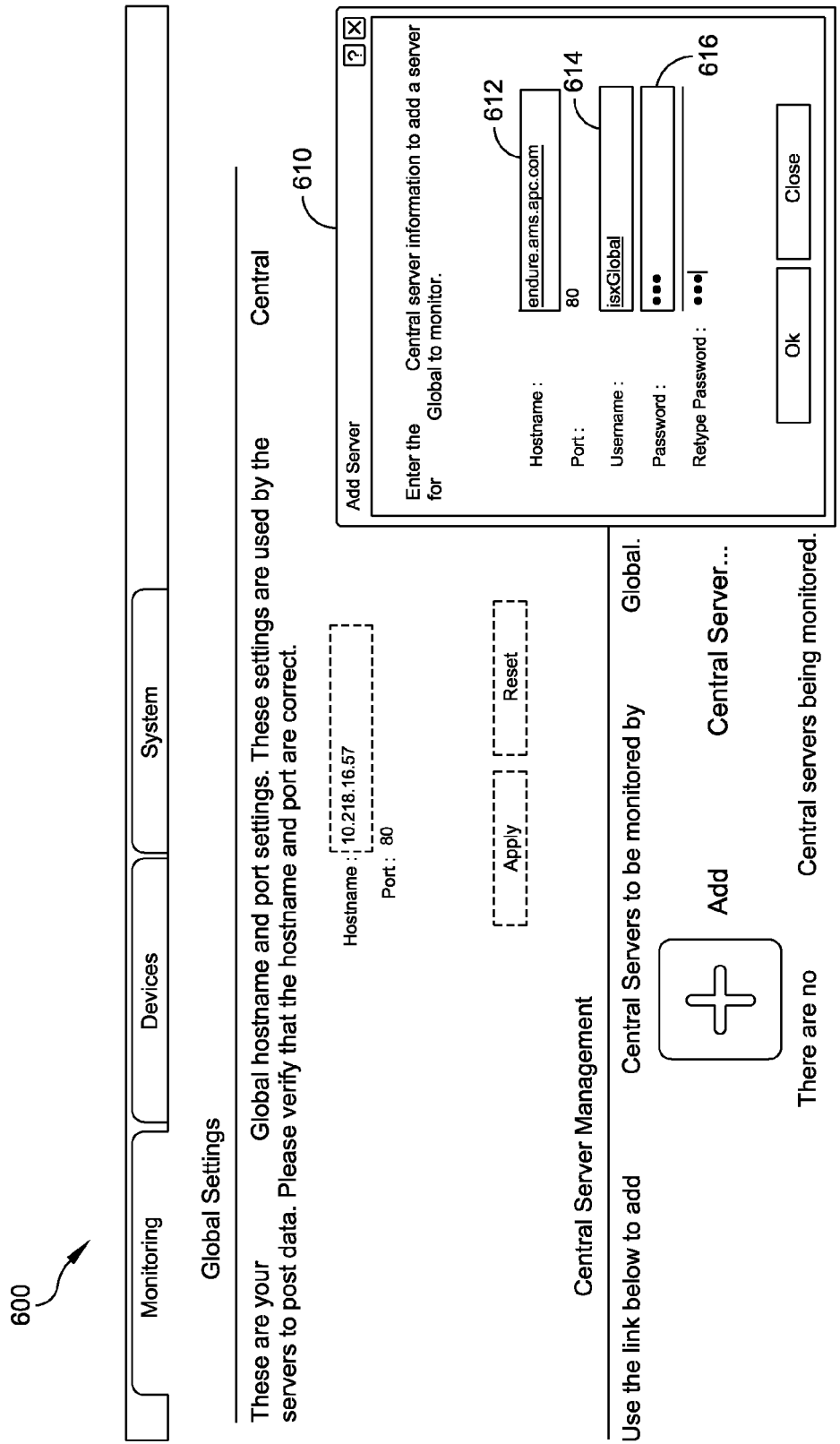
FIG. 6 illustrates a user interface in accordance with another embodiment of the present invention.

FIG. 6 illustrates a user interface 600 in accordance with one embodiment. The user interface 600 includes a server configuration dialog box 610, which includes a hostname entry field 612, a username entry field 614, and a password entry field 616. The user interface 600 is used by a user to add a central server, such as central server 114 of FIG. 1, to a global server, such as global server 116 of FIG. 1. The hostname entry field 612 is used to create the contact information data 222 of FIG. 2, and the username entry field 614 and the password entry field 616 are used to create the user-created credentials 220 of FIG. 2. The user interface 600 may be implemented on the global server 116 of FIG. 1. For example, code (e.g., HTML and/or JavaScript) may be stored on the global server 116 and deployed to the global client 120 when the user 124 requests it (e.g., by launching an application on the global client that is designed to call the global server for the user interface 600).

In one version of the data center infrastructure management system 100, the global client 120 may, for example, be a "thin client" device having limited processing capabilities, and therefore it is desirable to optimize the performance of the system. A thin client device, in one embodiment, is a terminal having at least the components necessary for receiving input from a user, displaying output to the user, and communicating with the global server 116. Some of the components on the thin client device may be provided by the global server 116 (e.g., a user interface or other application that enables the user to interact with and receive information from the system 100). Further, the performance of the system can be optimized in any number of ways, such as by minimizing the amount of processing performed by the global client, reducing data access and retrieval times (e.g., in particular, for critical data), pre-fetching data by anticipating future information requirements, and indexing the data to enable fast lookup and retrieval.

Figure 7:
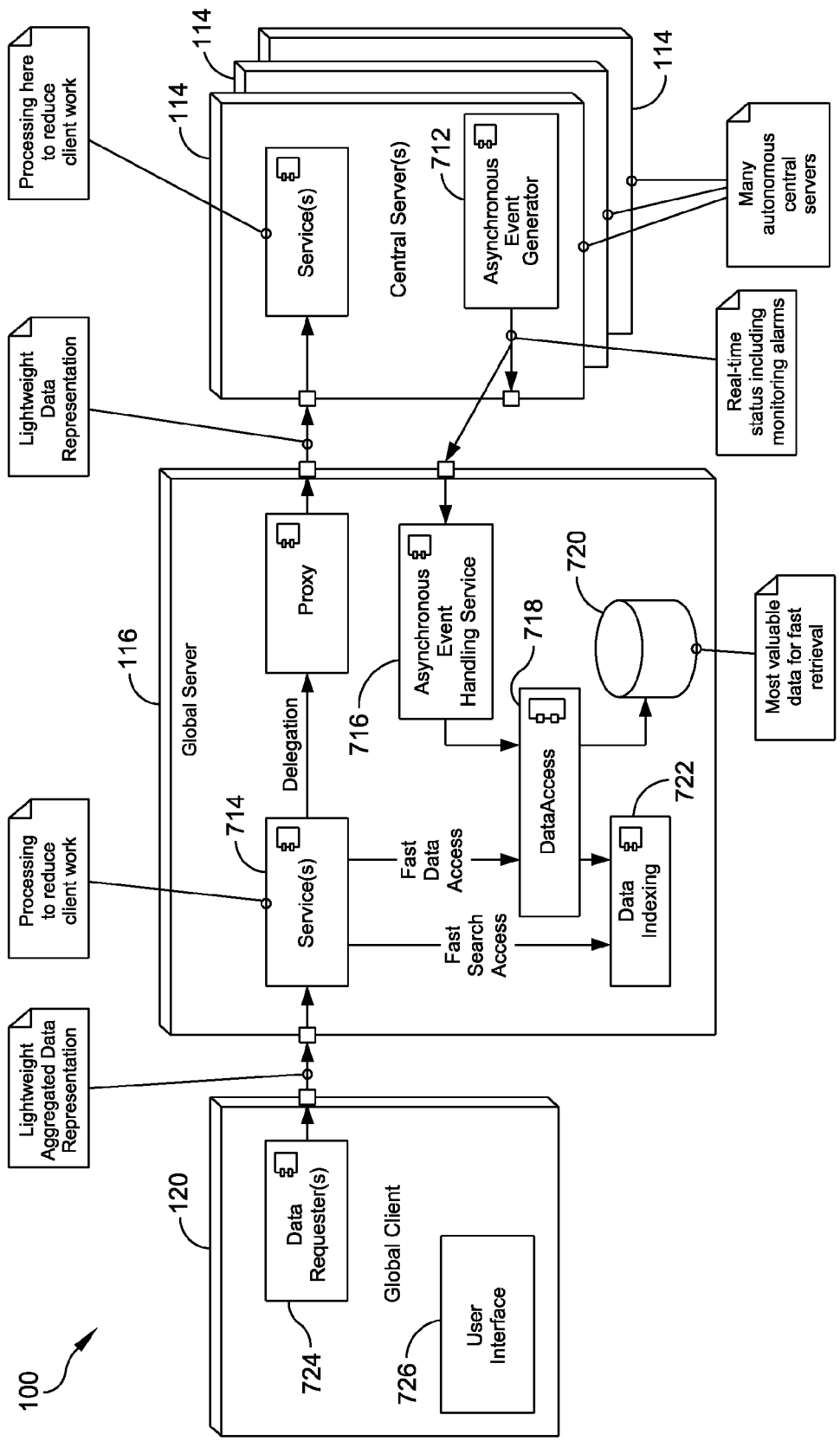
FIG. 7 shows a more detailed description of data flow in the data center infrastructure management system of FIG. 1.

FIG. 7 shows a more detailed description of data flow in the data center infrastructure management system 100 of FIG. 1 in accordance with one embodiment. The system 100 includes one or more central servers 114, a global server 116 connected to each of the central servers (e.g., over a network, not shown), and a global client 120 connected to the global server (e.g., over a network, not shown, such as the Internet). The central server 114 and the global server 116 may be personal computers, minicomputers, mainframe computers, data servers, or other types of computers. The global client 120 may be a personal computer, a terminal (e.g., a dumb terminal), a pager, a personal digital assistant or smart phone (such as iPhone® by Apple, Inc. of Cupertino, Calif.), a thin client device, or other computing device having a network interface.

Each central server 114 provides one or more services 710. The service 710 is configured to receive requests from the global server 116. The requests may include, for example, a request originating from the global client 120 for data that is stored on the central server 114. The service 710 may, additionally or alternatively, be configured to monitor and control various devices within a data center or multiple data centers responsive to, for example, service requests (e.g., requests for data) from users of the system 100. Each central server 114 further provides an asynchronous event generator 712 for generating events, such as alarms, warnings, notifications, status updates, and the like, using data collected by the services 710. The events are posted to the global server 116 as they are generated, or at a later time. Each of the central servers 114 may operate autonomously.

The global server 116 includes a centralized repository of information received from the central servers 114, and functions as a data gateway between the global client 120 and each central server. The global server 116 includes one or more services 716 for responding to service requests from the global client 120, an asynchronous event handler 718 for receiving and processing asynchronous events generated and posted by the asynchronous event generator 712, a data access component 718 for managing data storage and retrieval to and from a database 720, and a data indexing component 722 for indexing data stored within the global server 116 (e.g., within the database).

The global client 120 includes a data requester component 724 for requesting data from the global server 116, the central server 114, or both. The global client 120 further includes a user interface 726 for displaying data to a user and for enabling the user to interact with the system 100. The global client 120 periodically polls the global server 116 to retrieve the most up-to-date data that is available, or polls the global server in response to a user action (e.g., an action requesting information that is not locally available at the global client, the global server, or both).

The global server 116 aggregates, optimizes, and indexes data produced by each of the central servers 114. The data includes critical, real-time data used for managing one or more data centers, or less critical or ad hoc data. The global client 120 is configured to request, receive and display the data for the user. The data may be stored, for example, in the database 720 of the global server 116, or retrieved from one or more of the central servers 114. The database may contain a subset of all data contained in the central servers 114. For instance, the subset of data may include high-availability data (e.g., frequently accessed data, critical data, and so forth). The subset of data may be formatted in a lightweight format that is adapted for consumption by the global client 120 (e.g., where the global client is a thin client device). The database is populated as a result of both synchronous and asynchronous communication between the global server 116 and the central servers 120. The data includes data center asset inventory data, and may optionally include real-time alarms generated by the monitoring subsystems of the central servers 114, device logs, sensor data, or a combination of these. Asynchronous data may be automatically transmitted from the central server 114 to the global server 120 as it becomes available, for example, in real-time or near real-time. The global server 116 reacts to changes in the asynchronous data as they are sent from the central server 114.

The database 720 is used to store data regarding various devices that may be used in the data center, such as servers, uninterruptible power supplies, power strips, network connectivity equipment (such as network cabling, hubs, routers, wireless routers, switches, patch panels, etc.), automatic transfer switches, power distribution units, air conditioning units, racks and any other data center equipment. In one embodiment, the data stored in the database 720 includes one or more of the following:

Central server data
        hostname of central server
        Central server software version
        Central server server network address
    Central server device group data
        name of device group
        location
        severity (e.g. normal, warning, critical)
    Central server device data
        device type (e.g. UPS, PDU, cooler)
        device model number
        device network address
        device hostname
        device severity
        device location
        device label
        device serial number
    Current alarms
    Alarm history summary
    Device sensor list
    Device sensor history summary The global server 116 maintains one or more indexes of the data contained by the database 720. The index may be stored in memory (e.g., random-access memory) or on another computer-readable storage medium, such as a hard drive. An index, as used herein, is a data structure that is configured to improve the speed of data retrieval from the database 720, or other databases. The index may, for example, include a table of ordered records including the data (e.g., ordered by record identifiers, text terms within the data), the occurrence frequency of the data (e.g., the number of instances that a particular term is stored in the database), and the database table and identification information for locating the data record in the database. The indexes enable the global server 116 to perform rapid interactive searching of the data, as requested by the global client 120. Data received by the global server 116 is automatically stored in the database 720 and indexed by the data indexing component 722. If the global client 120 requests data that is not contained by the database 720, the services 714 of the global server 116 can automatically delegate the data search and retrieval to one or more of the central servers 114. Once the data is received by the global server 116 from the central server(s) 114, the global server can perform pre-processing and data aggregation to return a lightweight and easily processed representation of the data to the global client 120.

In one embodiment, the global server 116 stores software that is sent to the global client 120 automatically, for example, when the user first logs into the system 100. The software is used to generate the user interface and manage the information to be exchanged with the global server 116.

Figure 8:
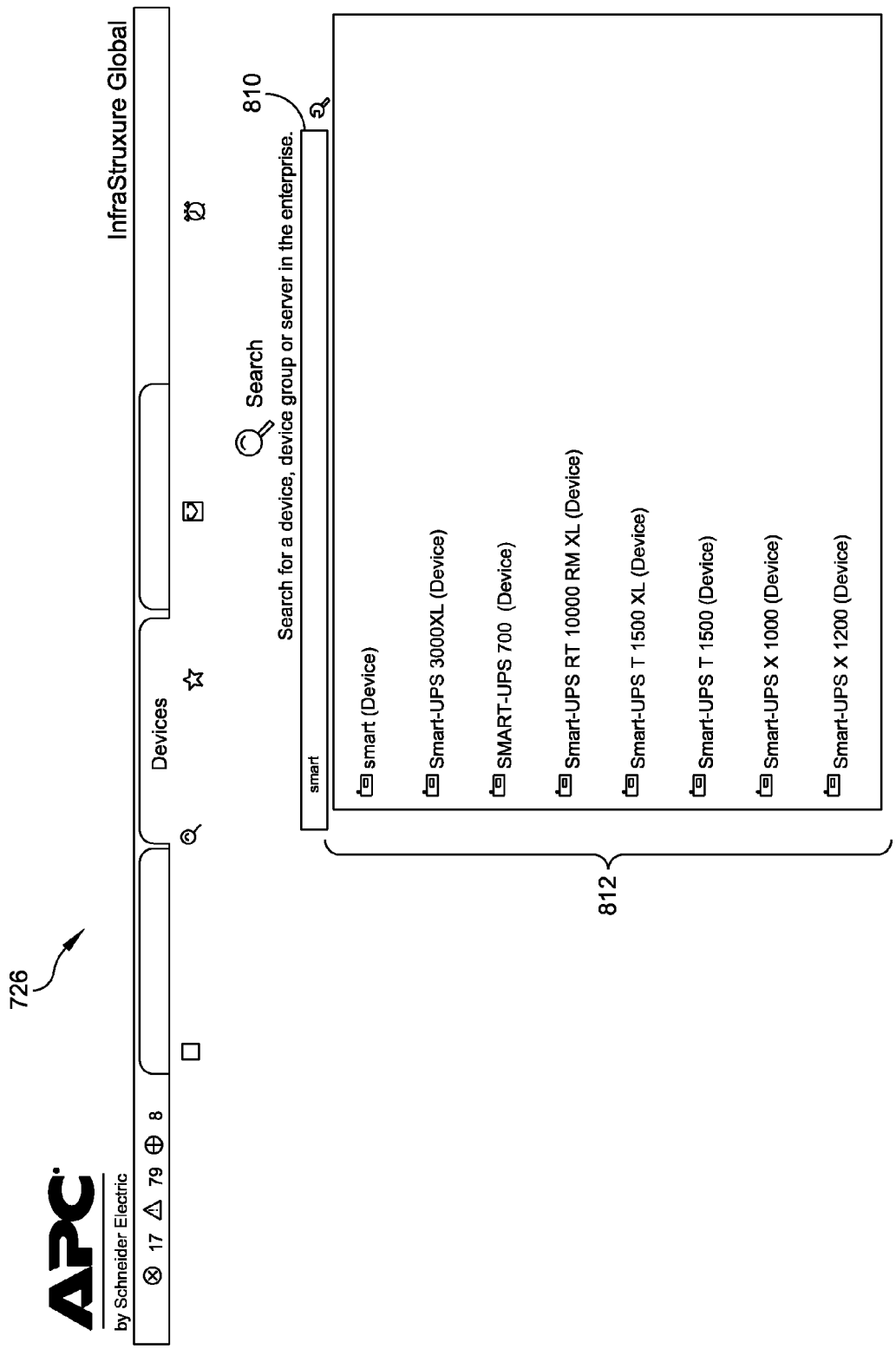
FIG. 8 shows a detailed view of a user interface as described with respect to FIG. 7.

FIG. 8 shows a detailed view of the user interface 726 of FIG. 7 in accordance with one embodiment. The user interface 726 includes a search query field 810 and a suggested search term list 812. As a user begins to enter a search query into the search query field 810, one or more suggested search terms are displayed in the search term list 812. The suggested search terms are derived from, for example, the data stored in the database 720 of FIG. 7. The data indexing component 722 of FIG. 7 is used to increase the speed at which the suggested search terms are derived. The suggested search terms may be derived, for example, based on one or more letters, words, or phrases entered by the user into the search query field 810. The suggested search terms may update dynamically as the user enters or modifies the search query. For example, as the user enters each character of the search query, the search term list is updated with a new set of suggested search terms. The user may select one of the suggested search terms to initiate a search of the data in the database 720, or initiate the search using the user-supplied search term.

Figure 9:
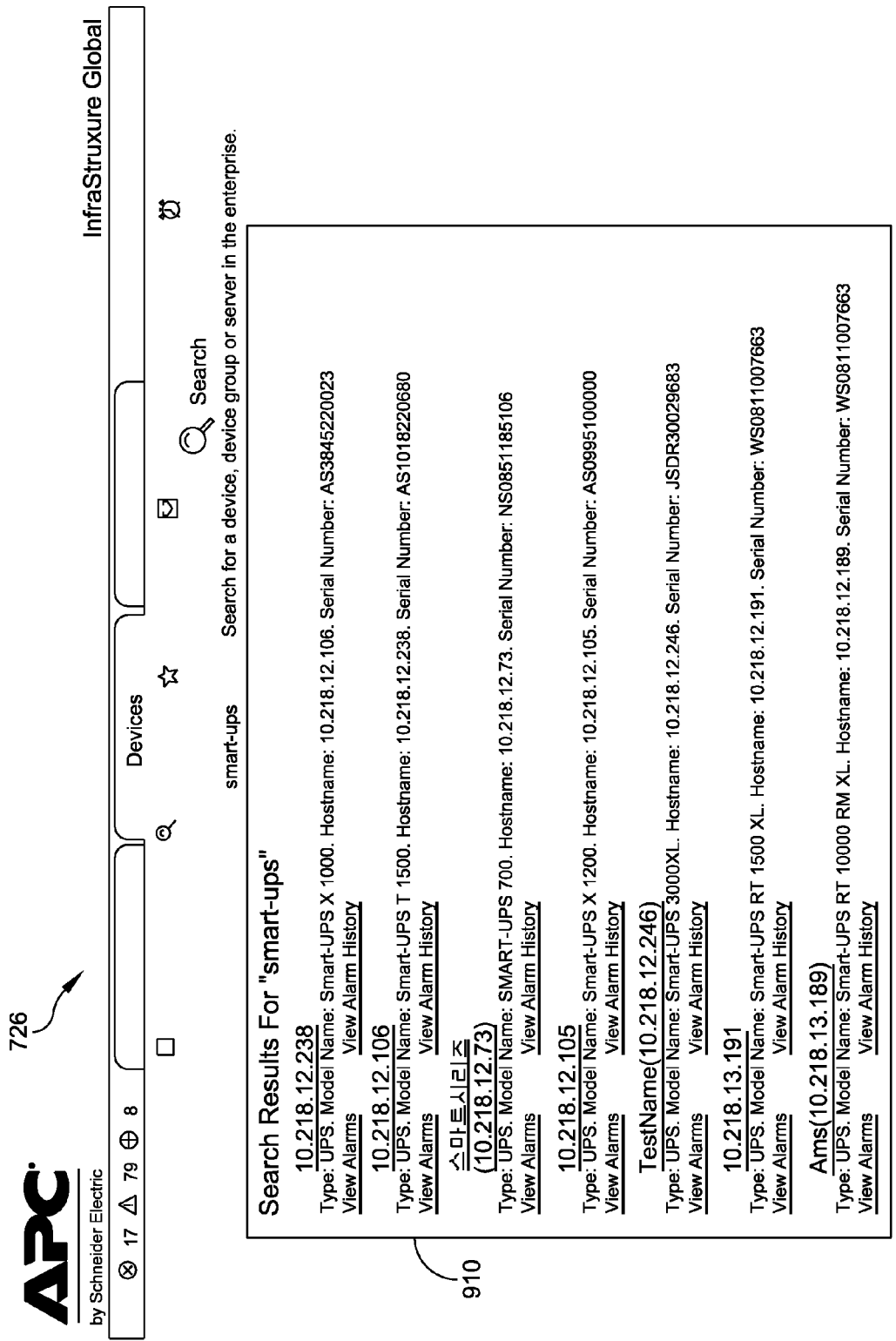
FIG. 9 shows a detailed view of the user interface of FIG. 7.

FIG. 9 shows a detailed view of the user interface 726 of FIG. 7 in accordance with another embodiment. The user interface 726 includes search results field 910 that includes one or more items representing the results of a search performed by the user, such as described above with reference to FIG. 8. The results may include data that is stored in the database 720 of FIG. 7, or data that is received from the central server 114.

Various embodiments of the present invention may be implemented on one or more computer systems. For example, system 100 may be implemented in a single computer system or in multiple computer systems. These computer systems may be, for example, general-purpose computers such as those based on Intel PENTIUM-type processor, Motorola PowerPC, Sun UltraSPARC, Hewlett-Packard PA-RISC processors, or any other type of processor.

Figure 10:
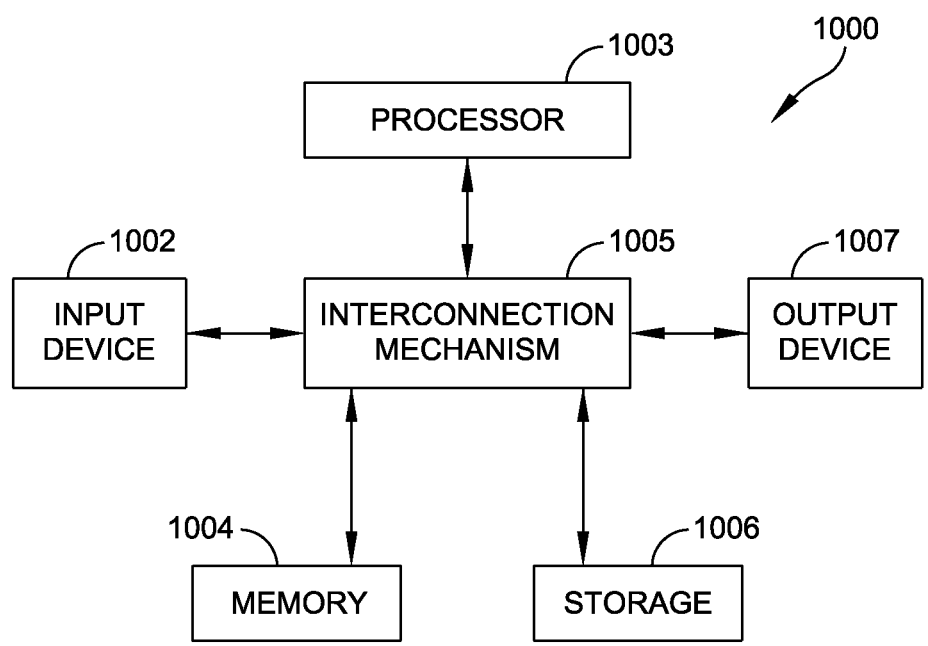
FIG. 10 is a functional block diagram of a data center infrastructure management system in accordance with one embodiment of the present invention.

For example, various aspects of the invention may be implemented as specialized software executing in a general-purpose computer system 1000 such as that shown in FIG. 10. The computer system 1000 may include a processor 1003 connected to one or more memory devices 1004, such as a disk drive, memory, or other device for storing data. Memory 1004 is typically used for storing programs and data during operation of the computer system 1000. The computer system 1000 may also include a storage system 1006 that provides additional storage capacity. Components of computer system 1000 may be coupled by an interconnection mechanism 1005, which may include one or more busses (e.g., between components that are integrated within a same machine) and/or a network (e.g., between components that reside on separate discrete machines). The interconnection mechanism 1005 enables communications (e.g., data, instructions) to be exchanged between system components of system 1000.

Computer system 1000 also includes one or more input devices 1002, for example, a keyboard, mouse, trackball, microphone, touch screen, and one or more output devices 1007, for example, a printing device, display screen, speaker. In addition, computer system 1000 may contain one or more interfaces (not shown) that connect computer system 1000 to a communication network (in addition or as an alternative to the interconnection mechanism 1005).

Figure 11:
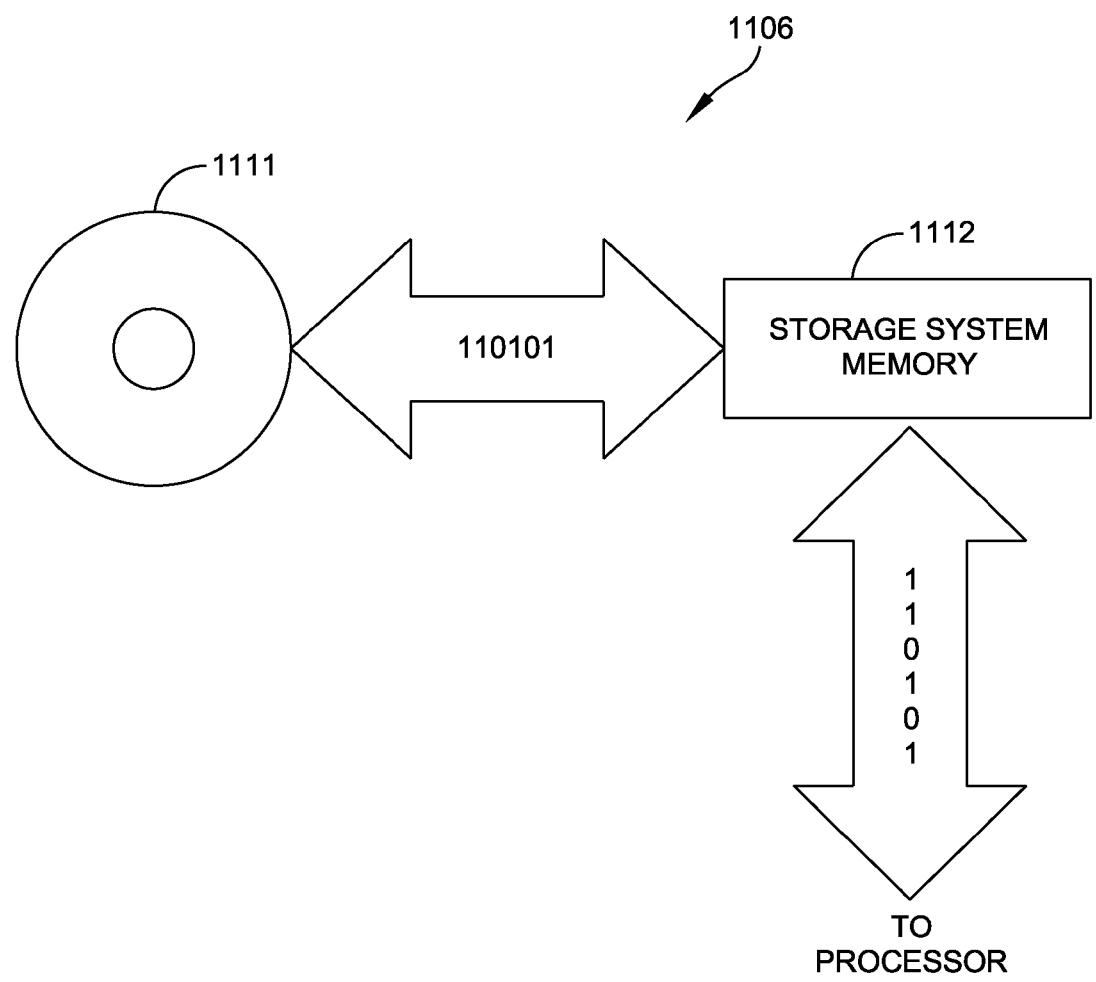
FIG. 11 is a functional block diagram of a storage system that may be used with the data center infrastructure management system of FIG. 10.

The storage system 1006, shown in greater detail in FIG. 11, typically includes a computer readable and writeable nonvolatile recording medium 1111 in which signals are stored that define a program to be executed by the processor or information stored on or in the medium 1111 to be processed by the program to perform one or more functions associated with embodiments described herein. The medium may, for example, be a disk or flash memory. Typically, in operation, the processor causes data to be read from the nonvolatile recording medium 1111 into another memory 1112 that allows for faster access to the information by the processor than does the medium 1111. This memory 1112 is typically a volatile, random access memory such as a dynamic random access memory (DRAM) or static memory (SRAM). It may be located in storage system 1106, as shown, or in memory system 1004. The processor 1003 generally manipulates the data within the integrated circuit memory 1004,1112 and then copies the data to the medium 1111 after processing is completed. A variety of mechanisms are known for managing data movement between the medium 1111 and the integrated circuit memory element 1004, 1112, and the invention is not limited thereto. The invention is not limited to a particular memory system 1004 or storage system 1006.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1000 is shown by way of example as one type of computer system upon which various aspects of the invention may be practiced, it should be appreciated that aspects of the invention are not limited to being implemented on the computer system as shown in FIG. 10. Various aspects of the invention may be practiced on one or more computers having a different architecture or components shown in FIG. 10. Further, where functions or processes of embodiments of the invention are described herein (or in the claims) as being performed on a processor or controller, such description is intended to include systems that use more than one processor or controller to perform the functions.

Computer system 1000 may be a general-purpose computer system that is programmable using a high-level computer programming language. Computer system 1000 may be also implemented using specially programmed, special purpose hardware. In computer system 1000, processor 1003 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP or Vista operating systems available from the Microsoft Corporation, MAC OS System X operating system available from Apple Computer, the Solaris operating system available from Sun Microsystems, or UNIX operating systems available from various sources. Many other operating systems may be used.

The processor and operating system together define a computer platform for which application programs in high-level programming languages are written. It should be understood that embodiments of the invention are not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present invention.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or Q (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Embodiments of a systems and methods described above are generally described for use in relatively large data centers having numerous equipment racks, however, embodiments of the invention may also be used with smaller data centers and with facilities other than data centers.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of authenticating communications, the method comprising acts of:
    receiving, by a computer, a first set of credentials;
    verifying the first set of credentials by comparing the first set of credentials to a plurality of sets of credentials stored in a database;
    subsequent to verifying the first set of credentials, creating a second set of credentials by the computer;
    transmitting the second set of credentials to a remote computer;
    receiving, by the computer, the second set of credentials from the remote computer; providing, by the computer to the remote computer, unsolicited access to services provided by the computer responsive to receiving the second set of credentials, the services being configured to receive events posted to the computer by the remote computer; and
    in response to at least one event, automatically changing at least one of the first set of credentials and the second set of credentials using the at least one of the first set of credentials and the second set of credentials as a seed for determining a new set of credentials to replace the at least one of the first set of credentials and the second set of credentials.

2. The method of claim 1, further comprising an act of receiving, by the computer, contact information for the remote computer.

3. The method of claim 1, wherein the act of verifying the first set of credentials is performed by the remote computer.

4. The method of claim 1, wherein the first set of credentials is created by a user of the computer.

5. The method of claim 4, wherein the first set of credentials is created on the remote computer.

6. The method of claim 1, wherein the first set of credentials includes a username and password.

7. The method of claim 1, wherein at least one of the first set of credentials and the second set of credentials is encrypted by the computer.

8. The method of claim 1, wherein the second set of credentials is stored in a database accessible by the computer.

9. The method of claim 1, further comprising an act of establishing, by the remote computer, secure communications with the computer using at least the second set of credentials.

10. The method of claim 1, wherein the act of automatically changing occurs periodically.

11. The method of claim 1, wherein the act of automatically changing occurs in response to at least one of a user event, a system event, and a security event.

12. A method of authenticating communications between a first computer and a second computer, the method comprising acts of:
    receiving, from a user, a first set of credentials at the first computer;
    receiving, from the user, the first set of credentials at the second computer; calling, by the second computer, a first service operating on the first computer, the first service configured to provide verification of the first set of credentials to the second computer;
    responsive to receiving the verification of the first set of credentials from the first computer, creating a second set of credentials by the second computer;

transmitting, by the second computer, the second set of credentials to the first computer;

receiving, by the second computer, the second set of credentials from the first computer;

providing, by the second computer to the first computer, unsolicited access to services provided by the second computer responsive to receiving the second set of credentials, the services being configured to receive events posted to the second computer by the first computer; and in response to at least one event, automatically changing at least one of the first set of credentials and the second set of credentials using the at least one of the first set of credentials and the second set of credentials as a seed for determining a new set of credentials to replace the at least one of the first set of credentials and the second set of credentials.

13. The method of claim 12, further comprising an act of establishing, by the second computer, secure communications with the first computer using at least the second set of credentials.

14. The method of claim 13, further comprising an act of establishing, by the first computer, secure communications with the second computer using at least the first set of credentials.

15. The method of claim 12, wherein the act of automatically changing occurs periodically.

16. The method of claim 12, wherein the act of automatically changing occurs in response to at least one of a user event, a system event, and a security event.

17. A data center infrastructure management system, comprising:
  a network;
  a first server connected to the network;
  a plurality of data center infrastructure devices connected to the first server, the first server being configured to maintain device data related to management of the plurality of data center infrastructure devices; and
  a second server connected to the network and configured to verify a set of user-created credentials, to be supplied by the first server, by comparing the set of user-created credentials to a plurality of sets of user-created credentials stored in a database, the second server further configured to receive requests from a user, the second server further configured to create a set of server-created credentials based on the set of user-created credentials subsequent to verifying the set of user-created credentials, the second server further configured to transmit the set of server-created credentials to the first server subsequent to creating the set of server-created credentials;
  wherein the first server uses the set of server-created credentials to secure communication with the second server for exchanging the device data with the second server,
  wherein the second server provides the first server with unsolicited access to services provided by the second server responsive to receiving the server-created credentials, the services being configured to receive events posted to the second server by the first server based, and
  wherein in response to at least one event, automatically changing at least one of the first set of credentials and the second set of credentials using the at least one of the first set of credentials and the second set of credentials as a seed for determining a new set of credentials to replace the at least one of the first set of credentials and the second set of credentials.

18. The system of claim 17, wherein the system is configured to establish secure communication between the first server and the second server through the network using at least the set of user-created credentials and the set of server-created credentials.

* * * * *